(12) United States Patent
Kim et al.

(10) Patent No.: US 8,260,124 B2
(45) Date of Patent: Sep. 4, 2012

(54) METHOD AND APPARATUS FOR REPRODUCING DIGITAL BROADCAST AND METHOD OF RECORDING DIGITAL BROADCAST

(75) Inventors: Ho-seon Kim, Suwon-si (KR); Hyung-il Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1203 days.

(21) Appl. No.: 11/777,435

(22) Filed: Jul. 13, 2007

(65) Prior Publication Data

US 2008/0193107 A1 Aug. 14, 2008

(30) Foreign Application Priority Data

Feb. 14, 2007 (KR) .................. 10-2007-0015533

(51) Int. Cl.
*H04N 5/917* (2006.01)
(52) U.S. Cl. ............... 386/331; 386/332; 386/335
(58) Field of Classification Search .............. 386/68, 386/331
See application file for complete search history.

(56) References Cited

U.S. PATENT DOCUMENTS

| 2003/0118322 | A1 | 6/2003 | Kim | |
|---|---|---|---|---|
| 2004/0163121 | A1* | 8/2004 | Hyun | 725/112 |
| 2004/0260839 | A1* | 12/2004 | Onoda et al. | 709/247 |

FOREIGN PATENT DOCUMENTS

| KR | 10-2003-0053192 A | 6/2003 |
|---|---|---|
| KR | 10-2003-0083215 A | 10/2003 |
| KR | 10-2006-0081970 A | 7/2006 |
| KR | 10-2006-0089979 A | 8/2006 |

OTHER PUBLICATIONS

Korean Office Action issued Jun. 10, 2011 in counterpart Korean Patent Application No. 10-2007-0015533.
Notice of Allowance issued Mar. 16, 2012 by the Korean Intellectual Property Office in counterpart Korean Application No. 10-2007-0015533.

* cited by examiner

*Primary Examiner* — Jamie Atala
(74) *Attorney, Agent, or Firm* — Sughrue Mion, PLLC (57) ABSTRACT

Provided are a method and apparatus for reproducing a digital broadcast having different compression formats and a method of recording the digital broadcast so that the digital broadcast may be consistently stored and reproduced regardless of a compression format of the digital broadcast. The method of reproducing a digital broadcast includes receiving a transport stream of the digital broadcast which is provided in a compression format; extracting an original stream of a desired program by demultiplexing the transport stream and extracting metadata from the original stream for reproducing or performing trick-play functions on the original stream; separately storing the original stream and the metadata; and decoding the original stream in accordance with the compression format and displaying the original stream. The method and apparatus allows a user to consistently perform functions on the digital broadcast regardless of a compression format of the digital broadcast.

25 Claims, 5 Drawing Sheets

FIG. 1

FIG. 4

METHOD AND APPARATUS FOR REPRODUCING DIGITAL BROADCAST AND METHOD OF RECORDING DIGITAL BROADCAST

CROSS-REFERENCE TO RELATED PATENT APPLICATION

This application claims priority from Korean Patent Application No. 10-2006-0015533, filed on Feb. 14, 2007, in the Korean Intellectual Property Office, the disclosure of which is incorporated herein in its entirety by reference.

BACKGROUND OF THE INVENTION

1. Field of the Invention

The present invention relates to a method of reproducing a digital broadcast, and more particularly, to a method and apparatus for reproducing a digital broadcast which supports at least two compression formats and a method of recording the digital broadcast.

2. Description of the Related Art

In conventional general analog television broadcasts, image signals are amplitude modulated or frequency modulated and then are transmitted by using electric waves and wired cables. However, currently, standardization and regularization of digital television broadcasts are rapidly progressing due to development of digital technologies such as digital image compression and digital modulation/demodulation. Furthermore, conventional territorial, satellite, and cable broadcasts are also tending to be digitized based on Moving Picture Experts Group (MPEG) formats.

Digital broadcasting may provide a higher quality broadcasting service than an analog broadcasting signal service, in accordance with the development of a digital image/sound compression technology and a digital transmission technology. In particular, in digital broadcasting, a plurality of broadcast programs may be multiplexed and transmitted in the same band and mutual operations of digital communication media and digital storage media may be greatly improved.

Also, in digital broadcasting, a plurality of broadcast programs encoded based on the MPEG formats are multiplexed and then transmitted in the form of transport streams. The transport streams are received by a digital broadcasting receiver such as a set-top box and the broadcast programs included in the transport streams are demultiplexed.

Accordingly, only one program, which a user wants, is selected. The selected program is restored into original audio and video signals by using a decoder included in the digital broadcasting receiver such as the set-top box, and is transmitted and output to an audio/video output device such as a television.

Furthermore, currently, a digital broadcasting receiver such as a personal video recorder (PVR) has a digital broadcast recording/reproducing function. The digital broadcasting receiver such as a PVR includes a high-capacity hard disk so that the broadcast programs transmitted and output to the audio/video output device such as the television may be stored in the hard disk and then output and reproduced upon a user's request.

The PVR, which supports conventional Moving Picture Experts Group 2 (MPEG2) formats, performs random access by using a sequence (SEQ) header and a location of an I picture of an MPEG2 transport stream and performs trick-play functions such as pausing, instant playing, rewinding, etc. by using locations of an I picture, a predictive (P) picture, and a bidirectional (B) picture of the MPEG2 transport stream.

Digital broadcasts in both the H.264 format and the MPEG2 format are in use, thus transport streams in both the MPEG2 format and the H.264 format are broadcast. Since the MPEG2 and H.264 formats are different compression formats, an H.264 transport stream has a different structure from an MPEG2 transport stream. Thus, the conventional PVR may not consistently perform trick-play functions when the H.264 transport stream is received.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

A method of reproducing a digital broadcast having different compression formats so that the digital broadcast may be consistently stored and reproduced regardless of a compression format of the digital broadcast is provided.

An apparatus for reproducing a digital broadcast having different compression formats so that the digital broadcast may be consistently stored and reproduced regardless of a compression format of the digital broadcast is also provided.

Further, a method of recording a digital broadcast having different compression formats so that the digital broadcast may be consistently stored regardless of a compression format of the digital broadcast is provided.

According to an aspect of the present invention, there is provided a method of reproducing a digital broadcast, the method including receiving a transport stream of the digital broadcast which is provided in a compression format; extracting an original stream of a desired program by demultiplexing the transport stream and extracting metadata from the original stream for reproducing or performing trick-play functions on the original stream; separately storing the original stream and the metadata; and decoding the original stream in accordance with the compression format and displaying the original stream.

The compression format may be an MPEG2 format or an H.264 format.

The metadata may include information on at least one of a header, an intra picture, a reference picture, and a non-reference picture.

If the compression format is an MPEG2 format, the metadata may include information on at least one of a sequence (SEQ) header, an intra (I) picture, a predictive (P) picture, and a bidirectional (B) picture.

If the compression format is an H.264 format, the metadata may include information on at least one of a sequence parameter set (SPS), an instant decoding refresh (IDR) picture, a non-instant decoding refresh (non-IDR) reference picture, and a non-IDR non-reference picture.

The method may further include performing single rate reproduction by using the intra picture, the reference picture, and the non-reference picture.

The method may further include performing fast forward/rewind by using the intra picture.

The method may further include performing smooth fast forward/rewind by using at least one of the intra picture and the reference picture.

The method may further include performing random access by using at least one of the header and the intra picture.

According to another aspect of the present invention, there is provided a computer readable recording medium having recorded thereon a computer program for causing a computer to execute a method of reproducing a digital broadcast, the program including computer executable instructions for receiving a transport stream of the digital broadcast which is provided in a compression format; extracting an original stream of a desired program by demultiplexing the transport stream and extracting metadata from the original stream for reproducing or performing trick-play functions on the original stream; separately storing the original stream and the metadata; and decoding the original stream in accordance with the compression format and displaying the original stream.

According to another aspect of the present invention, there is provided an apparatus for reproducing a digital broadcast, the apparatus including a demultiplexing unit which receives a transport stream of the digital broadcast which is provided in a compression format, extracts an original stream of a desired program by demultiplexing the transport stream and extracts metadata from the original stream for reproducing or performing trick-play functions on the original stream; a storage unit which separately stores the original stream and the metadata; and a decoder which decodes the original stream in accordance with the compression format so that the original stream can be displayed.

According to another aspect of the present invention, there is provided a method of recording a digital broadcast, the method including receiving a transport stream of the digital broadcast which is provided in a compression format; extracting an original stream of a desired program by demultiplexing the transport stream and extracting metadata from the original stream for reproducing or performing trick-play functions on the original stream; and separately storing the original stream and the metadata.

According to another aspect of the present invention, there is provided a computer readable recording medium having recorded thereon a computer program for causing a computer to execute a method of recording a digital broadcast, the method including receiving a transport stream of the digital broadcast which is provided in a compression format; extracting an original stream of a desired program by demultiplexing the transport stream and extracting metadata from the original stream for reproducing or performing trick-play functions on the original stream; and separately storing the original stream and the metadata.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art.

All terms including technical and scientific terms used herein have meanings which can be generally understood by those of ordinary skill in the art, if the terms are not particularly defined. General terms defined by dictionaries should be understood to have meanings which can be contextually understood in the art and should not have ideally or excessively formal meanings, if the terms are not defined particularly herein by the present invention.

Hereinafter, the present invention will be described in detail by explaining exemplary embodiments of the invention with reference to the attached drawings. Like reference numerals in the drawings denote like elements, and thus their description will be omitted.

Figure 1:
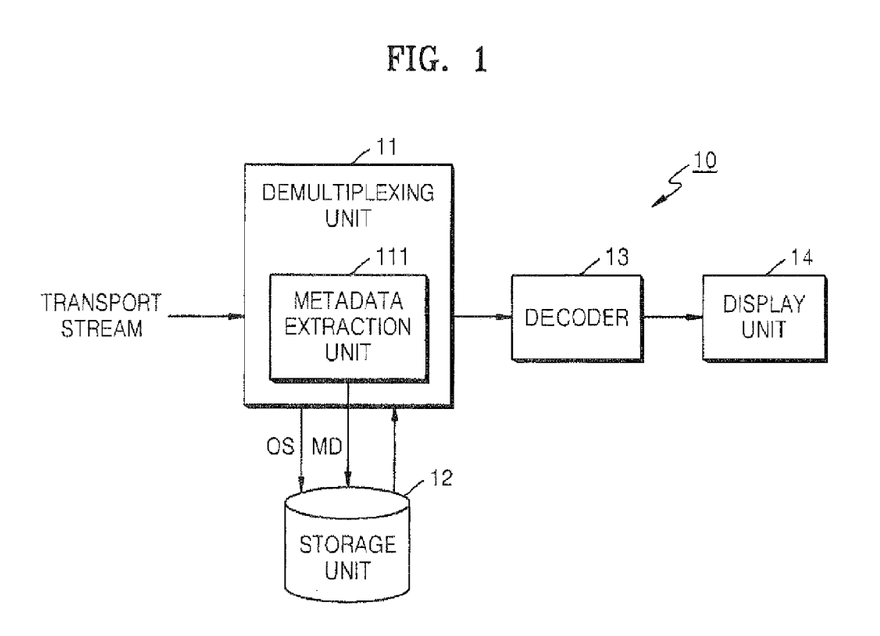
FIG. 1 is a block diagram illustrating an apparatus for reproducing a digital broadcast, according to an exemplary embodiment of the present invention.

FIG. 1 is a block diagram illustrating an apparatus 10 for reproducing a digital broadcast, according to an exemplary embodiment of the present invention.

Referring to FIG. 1, the apparatus 10 includes a demultiplexing unit 11, a storage unit 12, a decoder 13, and a display unit 14.

The demultiplexing unit 11 receives a transport stream of the digital broadcast which is provided in one of at least two compression formats. The two compression formats may be an MPEG2 format and an H.264 format. That is, the demultiplexing unit 11 receives an MPEG2 transport stream or an H.264 transport stream. A demultiplexing unit of a conventional apparatus for reproducing a digital broadcast may receive only an MPEG2 transport stream. However, the demultiplexing unit 11 of the apparatus 10 according to the current exemplary embodiment may receive an MPEG2 transport stream or an H.264 transport stream without including a separate transcoder.

The demultiplexing unit 11 demultiplexes the received transport stream and extracts an original stream OS of a desired program.

Also, the demultiplexing unit 11 includes a metadata extraction unit 111 and extracts metadata MD from the original stream OS in order to reproduce or perform trick-play functions on the original stream OS.

The metadata MD may include information on at least one of a header, an intra picture, a reference picture, and a non-reference picture.

The information on the header is used for random access, and the information on the intra picture is used for single rate reproduction, fast forward/rewind, smooth fast forward/rewind, and random access. The information on the reference image is used for single rate reproduction, and smooth fast forward/rewind, and the information on the non-reference image is used for a single rate reproduction. In other words, the information on the intra picture, the reference image, and the non-reference image is used for a single rate reproduction and the information on the intra picture is used for fast forward/rewind. The information on the intra picture and the reference image is used for smooth fast forward/rewind and the information on the header and the intra picture is used for random access.

For example, the MPEG2 transport stream may include a sequence (SEQ) header, an intra (I) picture, a predictive (P) picture, and a bidirectional (B) picture. The H.264 transport stream may include a sequence parameter set (SPS), a picture parameter set (PPS), an instant decoding refresh (IDR) picture, and a non-instant decoding refresh (non-IDR) picture.

The storage unit 12 separately stores the original stream OS provided by the demultiplexing unit 11 and the metadata MD provided by the metadata extraction unit 111.

The decoder 13 decodes the original stream OS provided by the demultiplexing unit 11 in accordance with the compression format of the transport stream and provides the decoded original stream to the display unit 14. Since the apparatus 10 according to the current exemplary embodiment may receive a transport stream of the digital broadcast which is provided in one of at least two compression formats, transport streams of the digital broadcast respectively provided in a plurality of compression formats may be received. According to an exemplary embodiment of the present invention, the apparatus 10 may include a plurality of decoders to correspond to the compression formats.

The display unit 14 receives and displays the decoded original stream from the decoder 13. According to an exemplary embodiment of the present invention, the display unit 14 may a digital television (DTV).

Figure 2:
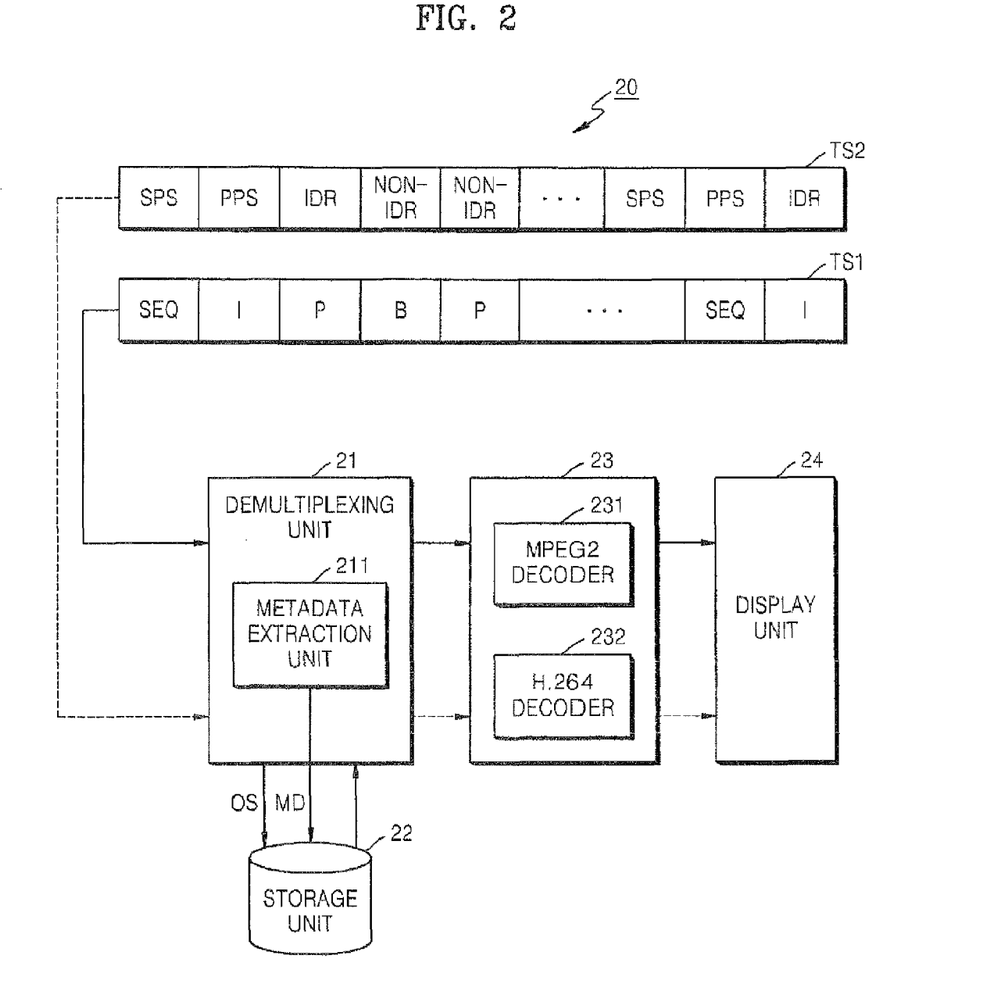
FIG. 2 is a block diagram illustrating an apparatus for reproducing a digital broadcast, according to another exemplary embodiment of the present invention.

FIG. 2 is a block diagram illustrating an apparatus 20 for reproducing a digital broadcast, according to another exemplary embodiment of the present invention.

Referring to FIG. 2, the apparatus 20 includes a demultiplexing unit 21, a storage unit 22, a decoding unit 23, and a display unit 24.

The demultiplexing unit 21 may receive a first transport stream TS1 provided in an MPEG2 format or a second transport stream TS2 provided in an H.264 format. The second transport stream TS2 may be directly input to the demultiplexing unit 21 without passing through a separate transcoder. The first transport stream TS1 includes a SEQ header and I, P and B pictures. The second transport stream TS2 includes an SPS, a PPS, an IDR picture, and a non-IDR picture.

The H.264 format is basically formed in network abstraction layer (NAL) units. An NAL including video data may be an IDR NAL or a non-IDR NAL. The IDR NAL may be randomly accessed and compressed without using temporal redundancy but by using only spatial redundancy. All frames input before the IDR NAL is input are removed from a frame buffer and are not referred to for compression.

On the other hand, the non-IDR NAL is formed of I, P, and B type slices. The P and B type slices are compressed by being prediction encoded by conventional codecs. The I type slice is basically compressed by using only spatial redundancy as in the IDR NAL. However, the I type slice does not delete the frames in the frame buffer since the P or B type slice may refer to the frames input before the I type slice is input.

An IDR frame formed of the IDR NAL may be a frame which allows random access used for a fast forward (FF)/rewind (REW) mode when video data is reproduced. On the other hand, a non-IDR frame formed of the non-IDR NAL may be not used as a frame which allows random access although the non-IDR frame is an I frame compressed by using only spatial redundancy. NALs input after the I frame may perform prediction encoding based on the frames input before the I frame. In most cases when frames which do not exist in the frame buffer are referred to, an error message is output by a software process or a malfunction of a decoder occurs.

The demultiplexing unit 21 demultiplexes the received first and second transport streams TS1 and TS2 and extracts an original stream OS of a desired program.

Also, the demultiplexing unit 21 includes a metadata extraction unit 211 and extracts metadata MD from the original stream OS in order to reproduce or perform trick-play functions on the original stream OS. The metadata MD may include information on a header, an intra picture, a reference picture, and a non-reference picture.

The information on the header is used for random access, and the information on the intra picture is used for single rate reproduction, fast forward/rewind, smooth fast forward/rewind, and a random access. The information on the reference image is used for single rate reproduction, and smooth fast forward/rewind, and the information on the non-reference image is used for a single rate reproduction. In other words, the information on the intra picture, the reference image, and the non-reference image is used for single rate reproduction and the information on the intra picture is used for fast forward/rewind. The information on the intra picture and the reference image is used for smooth fast forward/rewind and the information on the header and the intra picture is used for random access.

In FIG. 2, a case when the demultiplexing unit 21 receives the first transport stream TS1 is illustrated with a solid line and a case when the demultiplexing unit 21 receives the second transport stream TS2 is illustrated with a dotted line.

Operations of the metadata extraction unit 211 will now be described with reference to Table 1 by comparing the case when the demultiplexing unit 21 receives the first transport stream TS1 and the case when the demultiplexing unit 21 receives the second transport stream TS2.

TABLE 1

|  | MPEG2 | H.264 |
| --- | --- | --- |
| HEADER | SEQUENCE HEADER | SEQUENCE PARAMETER SET |
| INTRA PICTURE | I PICTURE | IDR PICTURE |
| REFERENCE PICTURE | P PICTURE | NON-IDR REFERENCE PICTURE |
| NON-REFERENCE PICTURE | B PICTURE | NON-IDR NON-REFERENCE PICTURE |

In the case when the demultiplexing unit 21 receives the first transport stream TS1, the metadata extraction unit 211 extracts information on the SEQ header and start points and sizes of the I, P and B pictures.

In the case when the demultiplexing unit 21 receives the second transport stream TS2, the metadata extraction unit 211 extracts information on the SPS, start points and sizes of the IDR and non-IDR pictures, and the reference image.

A conventional apparatus for reproducing a digital broadcast receives only an MPEG2 transport stream, extracts and stores metadata such as information on the SEQ header and start points and sizes of the I, P and B pictures of the MPEG2 transport stream and uses the metadata for reproduction and performing trick-play functions. However, an apparatus for reproducing a digital broadcast according to the current exemplary embodiment may extract and store metadata not only when an MPEG1 transport stream is received, but also when an H.264 transport stream is received, and use the metadata for reproduction and performing trick-play functions.

As shown in Table 1, the sequence header of the MPEG2 transport stream corresponds to the sequence parameter set of the H.264 transport stream, an I picture of the MPEG2 transport stream corresponds to an IDR picture of the H.264 transport stream, the P picture of the MPEG2 transport stream corresponds to the non-IDR reference picture of the H.264 transport stream, and the B picture of the MPEG2 transport stream corresponds to the non-IDR non-reference picture of the H.264 transport stream.

The storage unit 22 stores the original stream OS of the desired program which is provided by the demultiplexing unit 21 and also stores the metadata MD provided by the metadata extraction unit 211. If a request signal for, i.e., reproducing and performing trick-play functions of the desired program is received from a user, the storage unit 22 provides the original stream OS of the desired program to the demultiplexing unit 21.

The decoding unit 23 receives and decodes the original stream OS of the desired program from the demultiplexing unit 21. When the digital broadcast is reproduced live, the original stream OS received by the demultiplexing unit 21 is directly input to the decoding unit 23. However, when the digital broadcast is recorded and then reproduced, the original stream OS received by the demultiplexing unit 21 is stored in the storage unit 22 and then is input to the decoding unit 23 through the demultiplexing unit 21.

Since the apparatus 20 according to the current exemplary embodiment may receive a transport stream of the digital broadcast which is provided in one of at least two compression formats, transport streams of the digital broadcast respectively provided in a plurality of compression formats may be received. Therefore, the apparatus 20 according to the current exemplary embodiment receives an MPEG2 transport stream and an H.264 transport stream and thus the decoding unit 23 includes an MPEG2 decoder 231 and an H.264 decoder 232. According to an exemplary embodiment of the present invention, the apparatus 20 may include a plurality of decoders to correspond to the compression formats.

In the case when the demultiplexing unit 21 receives the first transport stream TS1, the MPEG2 decoder 231 decodes the original stream OS. In the case when the demultiplexing unit 21 receives the second transport stream TS2, the H.264 decoder 232 decodes the original stream OS.

The display unit 24 receives and displays the decoded original stream from the decoding unit 23.

As described above, in the case when the first transport stream TS1 is received, the apparatus 20 may perform single rate reproduction by using information on the I, P and B pictures, perform slow motion reproduction at ½, ½, or ⅛ speed by repeating the same picture of the I, P and B pictures, perform smooth fast forward/rewind by using information on the I and P pictures, perform fast forward/rewind by using information on the I picture, and perform random access by using a stop button, a replay button, and information on the SEQ header and the I picture.

In the case when the second transport stream TS2 is received, the apparatus 20 may perform single rate reproduction by using information on the IDR and non-IDR pictures, perform slow motion reproduction at ½, ½, or ⅛ speed by repeating the same picture of the IDR and non-IDR pictures, perform smooth fast forward/rewind by using information on the IDR and non-IDR pictures, perform fast forward/rewind by using information on the IDR and picture, and perform random access by using a stop button, a replay button, and information on the SPS and the IDR picture.

Figure 3:
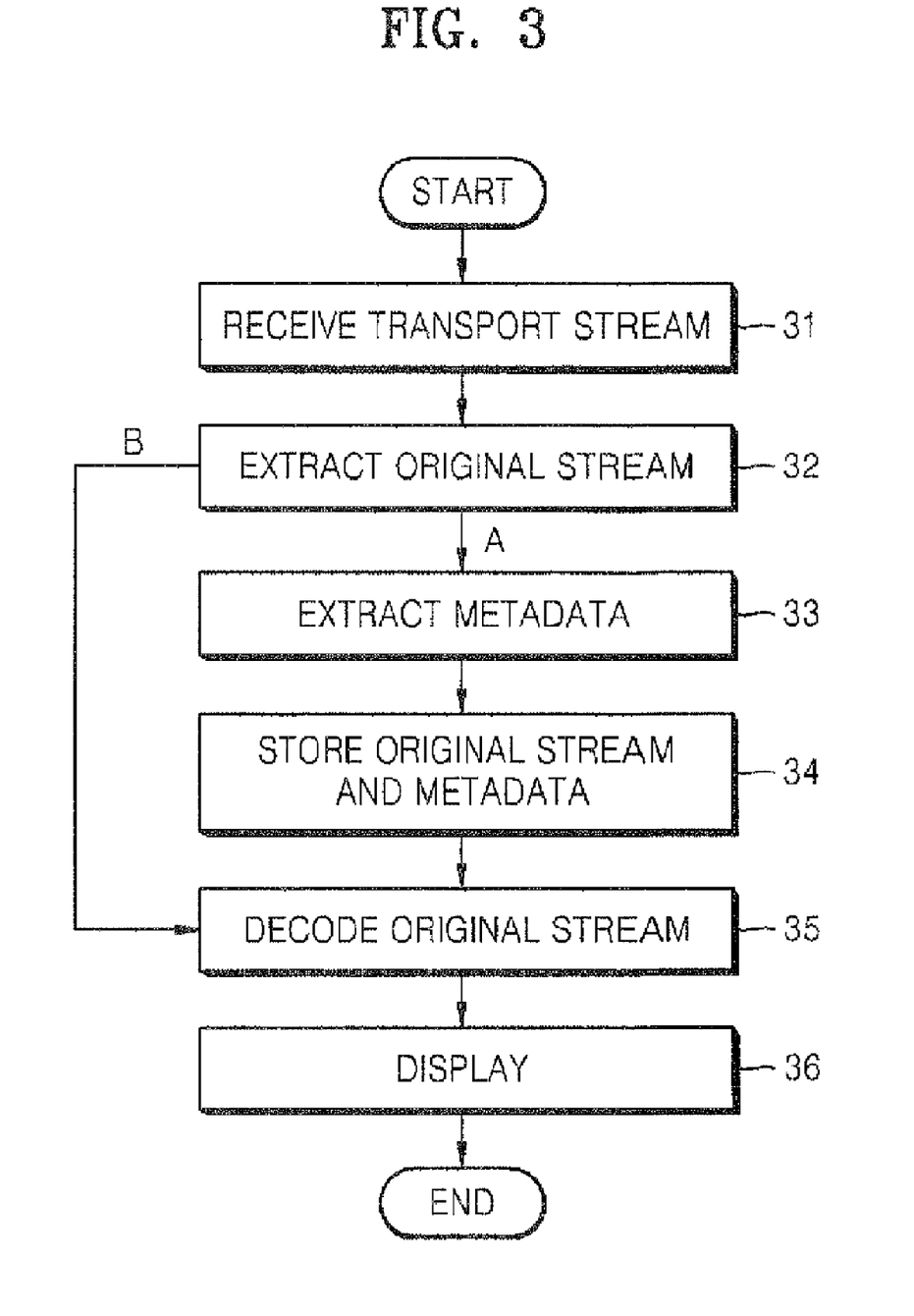
FIG. 3 is a flowchart illustrating a method of reproducing a digital broadcast, according to an exemplary embodiment of the present invention.

FIG. 3 is a flowchart illustrating a method of reproducing a digital broadcast, according to an exemplary embodiment of the present invention.

Referring to FIG. 3, a transport stream is received in operation 31. The transport stream is provided in one of at least two compression formats. The two compression formats may be an MPEG2 format and an H.264 format.

An original stream of a desired program is extracted from the received transport stream in operation 32. The digital broadcast may be recorded by using a personal video recorder (PVR) system and then be reproduced in case A or may be reproduced live in case B.

In case A, metadata for reproducing or performing trick-play functions on the original stream is extracted from the original stream in operation 33.

Then, the original stream and the metadata are separately stored in operation 34.

When a user requests for the recorded broadcast, the stored original stream is decoded in operation 35.

The decoded original stream is displayed by using a display unit in operation 36.

Meanwhile, in case B, after the original stream of the desired program is extracted, the extracted original stream is decoded in operation 35.

The decoded original stream is displayed by using a display unit in operation 36.

Figure 4:
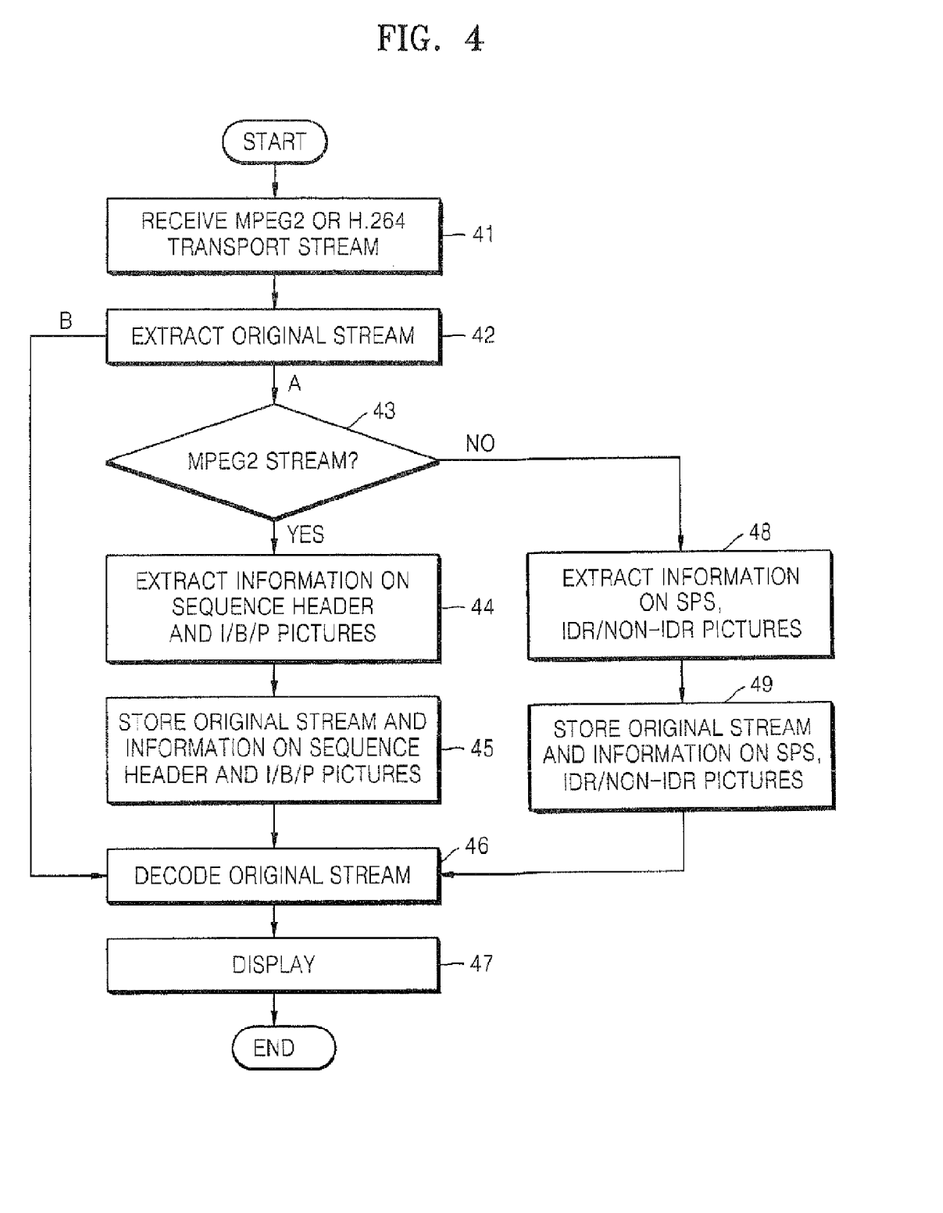
FIG. 4 is a flowchart illustrating a method of reproducing a digital broadcast, according to another exemplary embodiment of the present invention.

FIG. 4 is a flowchart illustrating a method of reproducing a digital broadcast, according to another exemplary embodiment of the present invention.

Referring to FIG. 4, a transport stream provided in an MPEG2 format (hereinafter referred to as an MPEG2 transport stream) or a transport stream provided in an H.264 format (hereinafter referred to as an H.264 transport stream) is received in operation 41.

An original stream of a desired program is extracted from the MPEG2 transport stream or the H.264 transport stream in operation 42. The digital broadcast may be recorded by using a PVR system and then be reproduced in case A or may be reproduced live in case B.

In case A, it is checked whether the received transport stream is the MPEG2 transport stream in operation 43.

If the received transport stream is the MPEG2 transport stream, information on a SEQ header and start points and sizes of I, P and B pictures is extracted from the original stream of the desired program in operation 44.

The original stream of the desired program and the information on the SEQ header and the start points and sizes of the I, P and B pictures are separately stored in operation 45.

When a user requests the recorded broadcast, the stored original stream is decoded in operation 46.

The decoded original stream is displayed by using a display unit in operation 47.

If the received transport stream is not the MPEG2 transport stream, that is, if the received transport stream is the H.264 transport stream, information on an SPS and start points and sizes of IDR and non-IDR pictures is extracted from the original stream of the desired program in operation 48.

The original stream of the desired program and the information on the SPS and the start points and sizes of the IDR and non-IDR pictures are separately stored in operation 49.

Then, when a user requests for the recorded broadcast, the stored original stream is decoded in operation 46.

The decoded original stream is displayed by using a display unit in operation 47.

Meanwhile, in case B, after the original stream of the desired program is extracted, the extracted original stream is decoded in operation 46.

The decoded original stream is displayed by using a display unit in operation 47.

Figure 5:
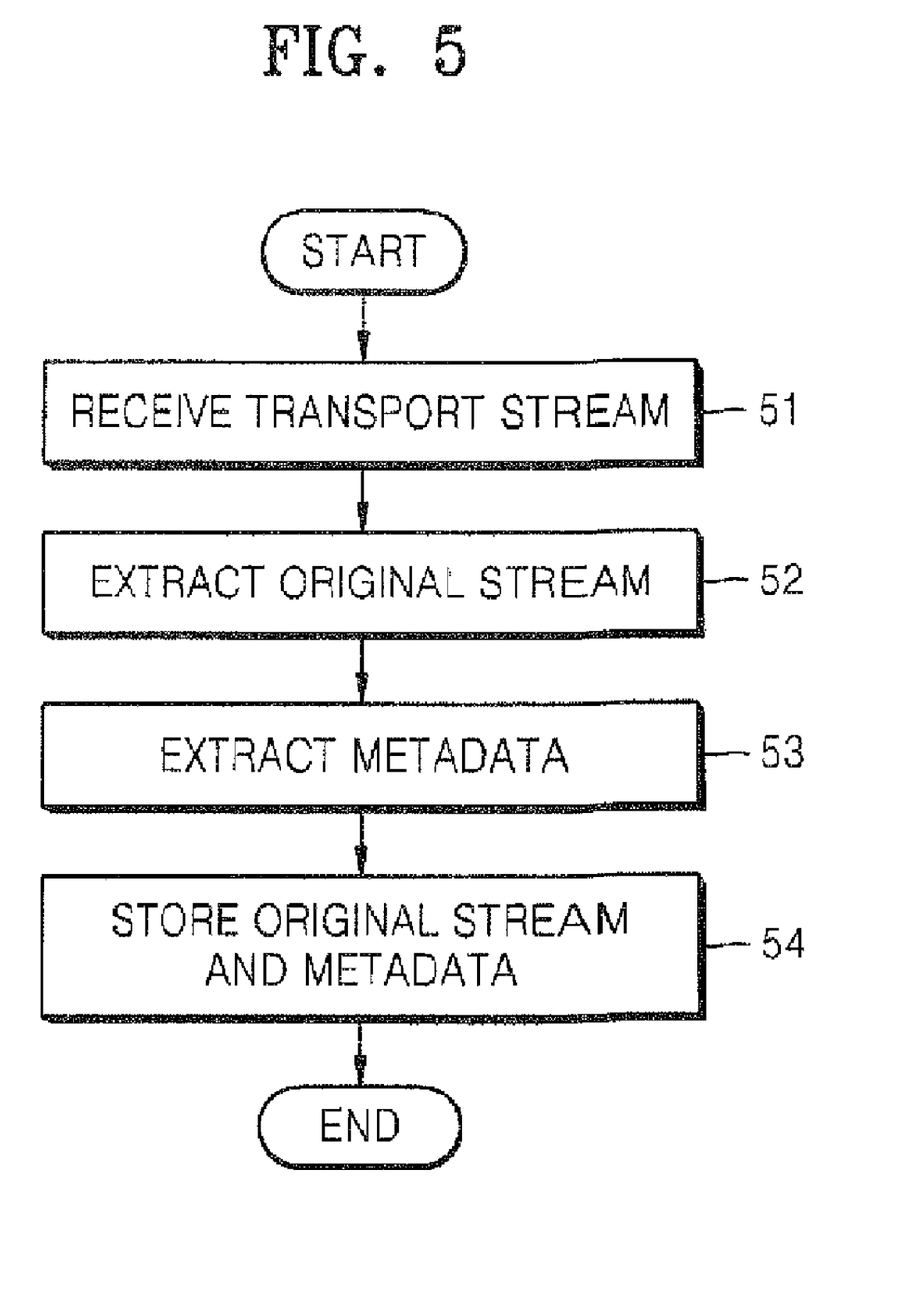
FIG. 5 is a flowchart illustrating a method of recording a digital broadcast, according to an exemplary embodiment of the present invention.

FIG. 5 is a flowchart illustrating a method of recording a digital broadcast, according to an exemplary embodiment of the present invention.

Referring to FIG. 5, a transport stream is received in operation 51. The transport stream is provided in one of at least two compression formats. The two compression formats may be an MPEG2 format and an H.264 format.

Then, an original stream of a desired program is extracted from the received transport stream in operation 52.

Then, metadata for reproducing or performing trek-play functions on the original stream is extracted from the original stream in operation 53. If an MPEG2 transport stream is received, the metadata about a SEQ header and start points and sizes of I, P and B pictures is extracted. If an H.264 transport stream is received, the metadata about an SPS and start points and sizes of IDR and non-IDR pictures is extracted.

Then, the original stream and the metadata are separately stored in operation 54.

As such, in a method of recording a digital broadcast according to the current exemplary embodiment, the digital broadcast may be consistently recorded when an MPEG2 transport stream or an H.264 transport stream is received.

The invention can also be embodied as computer readable codes on a computer readable recording medium. The computer readable recording medium is any data storage device that can store data which can be thereafter read by a computer system. Examples of the computer readable recording medium include, but are not limited to, read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, in a method and apparatus for reproducing a digital broadcast and a method of recording the digital broadcast according to the present invention, a user may consistently perform trick-play functions on the digital broadcast regardless of a compression format of the digital broadcast.

Furthermore, a manufacturer of the apparatus according to the present invention need not supply additional software for different compression formats of the digital broadcast.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of reproducing a digital broadcast performed by an apparatus supporting a plurality of compression formats, the method comprising:

receiving a transport stream of the digital broadcast which is provided in one of the plurality of compression formats;

extracting an original stream of a desired program by demultiplexing the transport stream and extracting metadata from the original stream for reproducing or performing trick-play functions on the original stream;

separately storing the original stream and the metadata; and decoding the original stream in accordance with the compression format and displaying the original stream, wherein the metadata includes information on at least one of a header, an intra picture, a reference picture, and a non-reference picture, wherein the extracting the metadata from the original stream comprises checking whether the transport stream is in a first compression format of the plurality of compression formats or in a second compression format of the plurality of compression formats, and if the transport stream is in the first compression format, the intra picture is a first type of intra picture, the reference picture is a first type of reference picture, and the non-reference picture is a first type of non-reference picture, and if the transport stream is in the second compression format, the intra picture is a second type of intra picture, the reference picture is a second type of reference picture, and the non-reference picture is a second type of non-reference picture.

2. The method of claim 1, wherein the first compression format is a Moving Picture Experts Group 2 (MPEG2) format and the second compression format is an H.264 format.

3. The method of claim 1, wherein, the first compression format is an MPEG2 format, and the metadata includes information on at least one of a sequence (SEQ) header, an intra (I) picture, a predictive (P) picture, and a bidirectional (B) picture.

4. The method of claim 1, wherein, the second compression format is an H.264 format, and the metadata includes information on at least one of a sequence parameter set (SPS), an instant decoding refresh (IDR) picture, a non-instant decoding refresh (non-IDR) reference picture, and a non-IDR non-reference picture.

5. The method of claim 1, further comprising performing single rate reproduction by using the intra picture, the reference picture, and the non-reference picture.

6. The method of claim 1, further comprising performing fast forward/rewind by using the intra picture.

7. The method of claim 1, further comprising performing smooth fast forward/rewind by using at least one of the intra picture and the reference picture.

8. The method of claim 1, further comprising performing random access by using at least one of the header and the intra picture.

9. A non-transitory computer readable recording medium having recorded thereon a computer program for causing a computer to execute a method of reproducing a digital broadcast, said program including computer executable instructions for performing steps according to claim 1.

10. An apparatus for reproducing a digital broadcast which supports a plurality of compression formats, the apparatus comprising:

a demultiplexing unit which receives a transport stream of the digital broadcast provided in one of the plurality of compression formats, extracts an original stream of a desired program by demultiplexing the transport stream and extracts metadata from the original stream for reproducing or performing trick-play functions on the original stream;

a storage unit which separately stores the original stream and the metadata; and a decoder which decodes the original stream in accordance with the compression format so that the original stream can be displayed, wherein the metadata includes information on at least one of a header, an intra picture, a reference picture, and a non-reference picture, wherein the extracting the metadata from the original stream comprises checking whether the transport stream is in a first compression format of the plurality of compression formats or in a second compression format of the plurality of compression formats, and if the transport stream is in the first compression format the intra picture is a first type of intra picture, the reference picture is a first type of reference picture, and the non-reference picture is a first type of non-reference picture, and if the transport stream is in the second compression format, the intra picture is a second type of intra picture, the reference picture is a second type of reference picture, and the non-reference picture is a second type of non-reference picture.

11. The apparatus of claim 10, wherein the first compression format is a Moving Picture Experts Group 2 (MPEG2) format and the second compression format is an H.264 format.

12. The apparatus of claim 10, wherein the first compression format is an MPEG2 format, and the metadata includes information on at least one of a sequence (SEQ) header, an intra (I) picture, a predictive (P) picture, and a bidirectional (B) picture.

13. The apparatus of claim 10, wherein the second compression format is an H.264 format, and the metadata includes information on at least one of a sequence parameter set (SPS), an instant decoding refresh (IDR) picture, a non-instant decoding refresh (non-IDR) reference picture, and a non-IDR non-reference picture.

14. The apparatus of claim 10, wherein the decoder performs single rate reproduction by using the intra picture, the reference picture, and the non-reference picture.

15. The apparatus of claim 10, wherein the decoder performs fast forward/rewind by using the intra picture.

16. The apparatus of claim 10, wherein the decoder performs smooth fast forward/rewind by using at least one of the intra picture and the reference picture.

17. The apparatus of claim 10, wherein the decoder performs random access by using at least one of the header and the intra picture.

18. A method of recording a digital broadcast performed by an apparatus supporting a plurality of compression formats, the method comprising:

receiving a transport stream of the digital broadcast which is provided in one of the plurality of compression formats;

extracting an original stream of a desired program by demultiplexing the transport stream and extracting metadata from the original stream for reproducing or performing trick-play functions on the original stream; and separately storing the original stream and the metadata, wherein the metadata includes information on at least one of a header, an intra picture, a reference picture, and a non-reference picture, wherein the extracting the metadata from the original stream comprises checking whether the transport stream is in a first compression format of the plurality of compression formats or in a second compression format of the plurality of compression formats, and if the transport stream is in the first compression format, the intra picture is a first type of intra picture, the reference picture is a first type of reference picture, and the non-reference picture is a first type of non-reference picture, and if the transport stream is in the second compression format, the intra picture is a second type of intra picture, the reference picture is a second type of reference picture, and the non-reference picture is a second type of non-reference picture.

19. The method of claim 18, wherein the first compression format is a Moving Picture Experts Group 2 (MPEG2) format and the second compression format is an H.264 format.

20. The method of claim 18, wherein the compression format is an MPEG2 format, and the metadata includes information on at least one of a sequence (SEQ) header, an intra (I) picture, a predictive (P) picture, and a bidirectional (B) picture.

21. The method of claim 18, wherein the compression format is an H.264 format, and the metadata includes information on at least one of a sequence parameter set (SPS), an instant decoding refresh (IDR) picture, a non-instant decoding refresh (non-IDR) reference picture, and a non-IDR non-reference picture.

22. A non-transitory computer readable recording medium having recorded thereon a computer program for causing a computer to execute a method of recording a digital broadcast, said program including computer executable instructions for performing steps according to claim 18.

23. The method of claim 1, wherein, if the compression format is an MPEG2 format, the intra picture is an intra (I) picture, the reference picture is a predictive (P) picture, and the non-reference picture is a bidirectional (B) picture, and if the compression format is an H.264 format, the intra picture is an instant decoding refresh (IDR) picture, the reference picture is a non-instant decoding refresh (non-IDR) reference picture, and the non-reference picture is a non-IDR non-reference picture.

24. The apparatus of claim 10, wherein, if the compression format is an MPEG2 format, the intra picture is an intra (I) picture, the reference picture is a predictive (P) picture, and the non-reference picture is a bidirectional (B) picture, and if the compression format is an H.264 format, the intra picture is an instant decoding refresh (IDR) picture, the reference picture is a non-instant decoding refresh (non-IDR) reference picture, and the non-reference picture is a non-IDR non-reference picture.

25. The method of claim 18, wherein, if the compression format is an MPEG2 format, the intra picture is an intra (I) picture, the reference picture is a predictive (P) picture, and the non-reference picture is a bidirectional (B) picture, and if the compression format is an H.264 format, the intra picture is an instant decoding refresh (IDR) picture, the reference picture is a non-instant decoding refresh (non-IDR) reference picture, and the non-reference picture is a non-IDR non-reference picture.

* * * * *